United States Patent
Jang (10) Patent No.: US 12,384,320 B2
(45) Date of Patent: Aug. 12, 2025

(54) CENTER SIDE AIRBAG

(71) Applicant: HYUNDAI MOBIS CO., LTD., Seoul (KR)

(72) Inventor: Rae Ick Jang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/475,412

(22) Filed: Sep. 27, 2023

(65) Prior Publication Data

US 2024/0140348 A1    May 2, 2024

(30) Foreign Application Priority Data

Oct. 26, 2022   (KR) .................. 10-2022-0139464
Oct. 27, 2022   (KR) .................. 10-2022-0140612

(51) Int. Cl.
| B60R 21/231 | (2011.01) |
| B60R 21/233 | (2006.01) |
| B60R 21/2338 | (2011.01) |

(52) U.S. Cl.
CPC ...... B60R 21/23138 (2013.01); B60R 21/233 (2013.01); B60R 21/2338 (2013.01); *B60R 2021/23146* (2013.01); *B60R 2021/23308* (2013.01); *B60R 2021/23324* (2013.01); *B60R 2021/23386* (2013.01)

(58) Field of Classification Search
CPC .......... B60R 21/231; B60R 21/23138; B60R 21/233; B60R 21/2338; B60R 2021/23146; B60R 2021/23161; B60R 2021/23308; B60R 2021/23324; B60R 2021/23386; B60R 2021/23388
See application file for complete search history.

(56) References Cited

U.S. PATENT DOCUMENTS

| 11,208,070 | B1* | 12/2021 | Jaradi ............... B60R 21/207 |
| 11,267,427 | B1* | 3/2022 | Deng ............... B60R 21/207 |
| 11,787,361 | B1* | 10/2023 | Patel ............... B60R 21/2338 |
| | | | 280/730.2 |
| 11,851,020 | B1* | 12/2023 | Deng ............... B60R 21/23138 |
| 2012/0119475 | A1* | 5/2012 | Choi ............... B60R 21/23138 |
| | | | 280/729 |
| 2019/0054890 | A1* | 2/2019 | Kwon ............... B60R 21/2338 |
| 2021/0094499 | A1* | 4/2021 | Deng ............... B60R 21/261 |
| 2023/0128759 | A1* | 4/2023 | Deng ............... B60R 21/2338 |
| | | | 280/743.2 |

FOREIGN PATENT DOCUMENTS

| KR | 10-2012-0051279 A | 5/2012 |
| WO | WO-2019107073 A1 * | 6/2019 |

* cited by examiner

*Primary Examiner* — Jason D Shanske
*Assistant Examiner* — Daniel M. Keck
(74) *Attorney, Agent, or Firm* — NovoTechIP International PLLC

(57) ABSTRACT

The present invention relates to a center side airbag capable of supporting the airbag cushion without relying on the center console to protect the occupants. The present invention introduces a center side airbag including an airbag cushion arranged between a first seat and a second seat and configured to deploy upward and downward, a lower region configured to deploy in a shape protruding toward the second seat from a lower portion of the airbag cushion, and an upper region configured to deploy in a shape protruding toward an occupant seated on the first seat from an upper portion of the airbag cushion.

8 Claims, 10 Drawing Sheets

CENTER SIDE AIRBAG

CROSS-REFERENCE TO RELATED APPLICATIONS

The present application claims priority to Korean Patent Application No. 10-2022-0139464, filed Oct. 26, 2022 and Korean Patent Application No. 10-2022-0140612, filed Oct. 27, 2022, the entire contents of which are incorporated herein for all purposes by this reference.

TECHNICAL FIELD

The present invention relates to a center side airbag that supports the airbag cushion without relying on the center console to protect the occupants.

BACKGROUND

The center side airbag deploys vertically between the driver and the front passenger, and it is supported either by the center console or between the driver and the front passenger to prevent collisions between occupants and to mitigate secondary collisions.

However, in electric vehicles or situations where the center console is removed or movable, it is not feasible to rely on the center console to support the airbag cushion.

In this case, when the occupants load onto the cushion, there is a problem with the cushion rotating horizontally and/or vertically around the mounting point on the seat, which significantly diminishes the restraint force applied to the occupants.

While tethers can assist in shaping the deployment of the cushion, relying solely on tethers poses challenges in effectively restraining the occupants.

The foregoing is intended merely to aid in the understanding of the background of the present invention, and is not intended to mean that the present invention falls within the purview of the related art that is already known to those skilled in the art.

SUMMARY

The present invention has been conceived to solve the above problems and it is an object of the present invention to provide a center side airbag capable of supporting the airbag cushion without depending on the center console for protecting the occupants.

In order to accomplish the above objects, the present invention is characterize by including an airbag cushion arranged between a first seat and a second seat and configured to deploy upward and downward, a lower region configured to deploy in a shape protruding toward the second seat from a lower portion of the airbag cushion, and an upper region configured to deploy in a shape protruding toward an occupant seated on the first seat from a upper portion of the airbag cushion.

the lower region may deploy in a wrapping motion protruding in one or more or inward and outward directions with respect to a side of the first seat.

The lower region may be wrapped by the tension created by a connecting member connected between an end portion of the lower region and an intermediate region of the airbag cushion.

The upper region may deploy in a wrapping motion protruding in one or more of inward and outward directions with respect to a side of the first seat.

The upper region may be wrapped by the tension created by a connecting member connected between an end portion of the upper region and an intermediate region of the airbag cushion.

The intermediate region may include an intermediate inactive zone without being filled with gas, and the connecting member is connected to the intermediate inactive zone.

The connecting member may be a tether.

the connecting member may be an upper and lower inactive zone formed to extend from an end portion of the upper region and an end portion of the lower region.

The lower region of the airbag cushion may deploy prior to the upper region.

The airbag cushion may include a first cushion deploying from the lower region and a second cushion deploying from the upper region, the first cushion deploying between a side of a first seat and a side of a second seat, the second cushion being connected to the first cushion to deploy upward at a position supporting a head of an occupant seated on the first seat, a connecting member being connected to the second cushion to create tension to pulling the second cushion toward the occupant seated on the first seat.

The first cushion may be supported by a seat cushion of the first seat.

The first cushion may deploy from the rear end of a side of a seat cushion.

The second cushion may be connected to a position biased toward the first seat on the first cushion.

The first cushion may deploy prior to the second cushion.

The second cushion may be smaller in deployment capacity than the first cushion.

The first cushion and the second cushion may be connected for gas to flow therebetween.

The connecting member may be connected to a position supporting the occupant on the first seat in response to the airbag being operated.

The connecting member may be connected between the first cushion and the second cushion.

The connecting member may be connected between a side of the first cushion facing the first seat and the upper end of the second cushion.

The connecting member may be a tether.

Through the means of solving the problems, the present invention achieves the advantageous effect of protecting the occupants' safety by providing support to the lower region of the airbag cushion on the front passenger seat in vehicles without a center console, which restrains the driver's legs and allows the upper region of the airbag cushion simultaneously restrains the driver's head.

Furthermore, supporting the airbag cushion on the front passenger seat prevents the rotation of the airbag cushion, which prevent the upper body of the driver from shifting towards the front passenger side, resulting in an improvement in the restraint force on the occupants.

Furthermore, by supporting the occupants solely through the deformation of the airbag cushion's shape, there is no need to increase the volume of the cushion or the capacity of the inflator, resulting in cost and weight reduction of the airbag cushion and offering favorable advantages in terms of airbag packaging.

DETAILED DESCRIPTION

Hereinafter, descriptions are made of the embodiments disclosed in the present specification with reference to the accompanying drawings in which the same reference numbers are assigned to refer to the same or like components and redundant description thereof is omitted.

As used in the following description, the suffixes "module" and "unit" are granted or used interchangeably for convenience of description but do not have distinct meanings or roles by themselves.

In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical spirit disclosed herein, and it should be understood that the embodiments include all changes, equivalents, and substitutes within the spirit and scope of the disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening components present.

As used herein, the singular forms are intended to include the plural forms as well, unless the context clearly indicates otherwise.

It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

Figure 1:
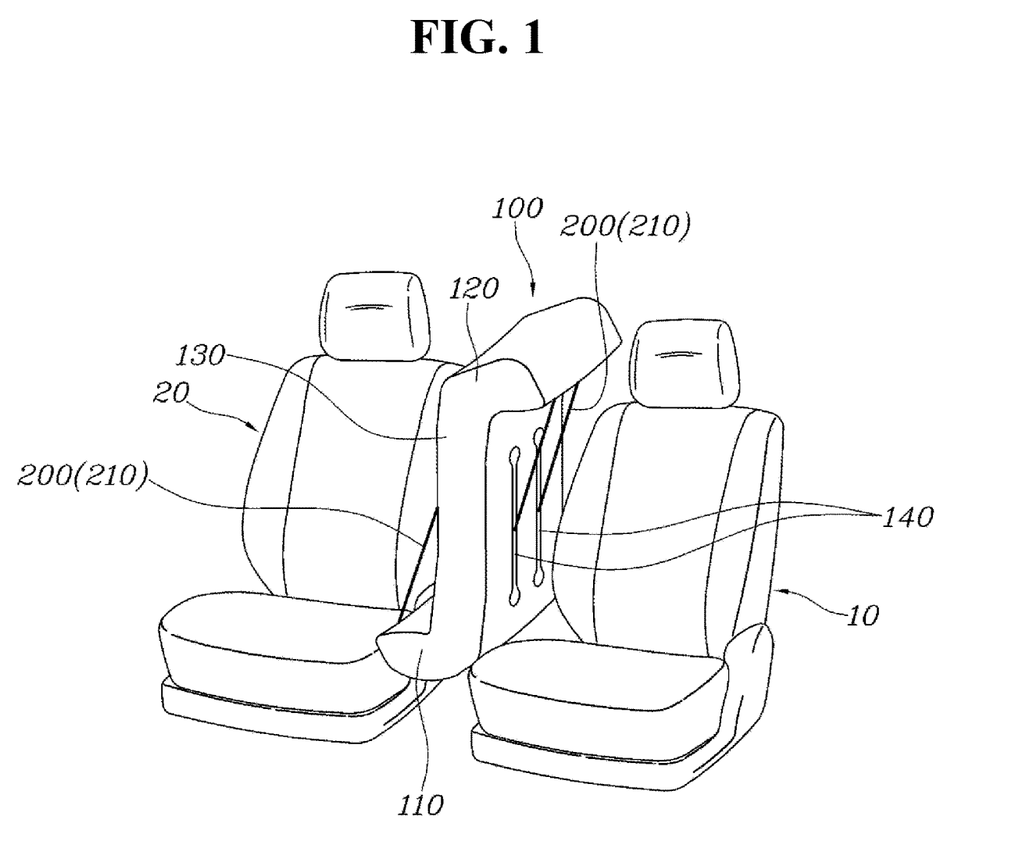
FIG. 1 is a diagram illustrating the deployed state of a center side airbag on a seat according to the present invention.
Figure 2:
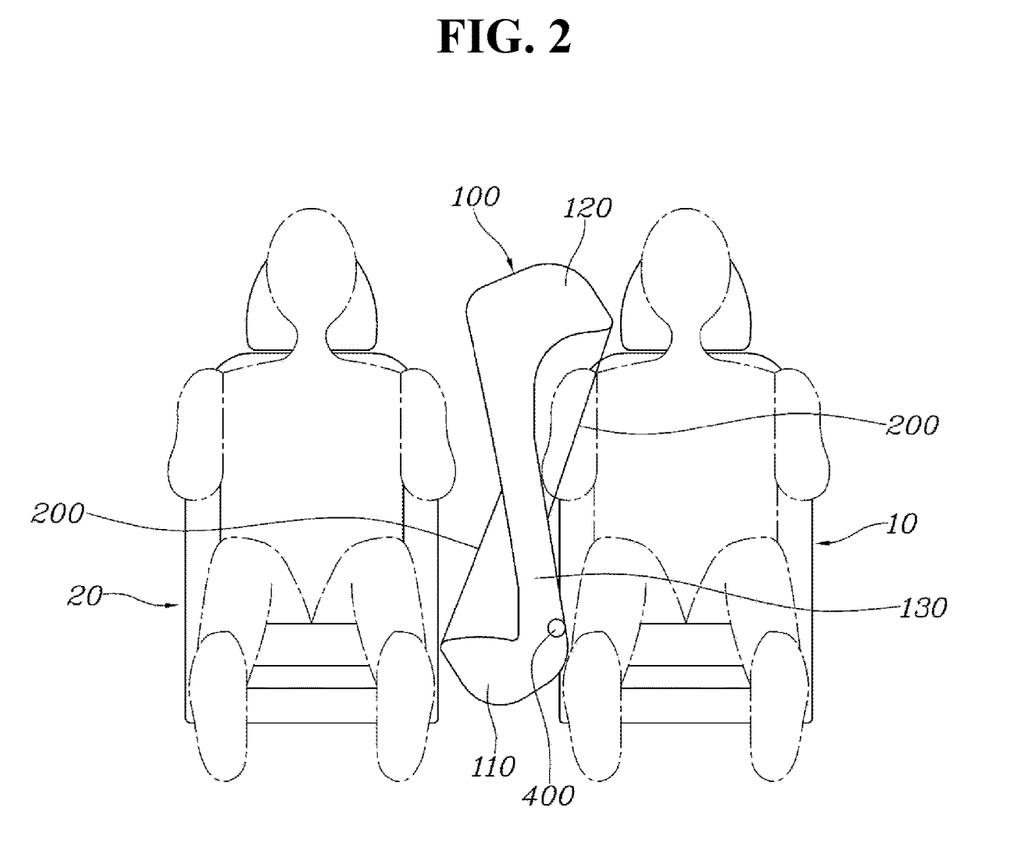
FIG. 2 is a diagram illustrating the operational state where a center side airbag is supported on the front passenger seat while supporting the driver's seat occupant.

With reference to FIGS. 1 and 2, the center side airbag of the present invention includes an airbag cushion 100 that deploys vertically between a first seat 10 and a second seat 20 arranged side by side. The airbag cushion 100 includes or is divided into (1) a lower region (or lower cushion) 110 that protrudes towards the second seat 20 from the lower part of the airbag cushion 100 when deployed, (2) an upper region (or upper cushion) 120 that protrudes towards a passenger seated on the first seat 10 from the upper part of the airbag cushion 100 when deployed, and (3) an intermediate region 130 extending vertically between the lower region 110 and the upper region 120. The airbag cushion 100 is configured such that, when inflated and deployed between the first seat 10 and the second seat 20, the intermediate region 130 has a first length in a vertical direction of a vehicle that is greater than a second length of the lower region 110 in the vertical direction of the vehicle and a third length of the upper region 120 in the vertical direction of the vehicle.

For example, the first seat 10 may be a driver's seat, while the second seat 20 may be a front passenger seat.

The airbag cushion 100 of the center side airbag is fixed to the side of the seat back frame of the driver's seat, deploying between the driver's seat and the front passenger seat.

The airbag cushion 100 is formed in a narrow width and long length chamber shape and deploys in the vertical direction.

The lower region 110 of the airbag cushion 100, which deploys from the lower side position of the seat, is deployed in a shape protruding towards the front passenger seat to be supported on the side of the front passenger seat.

The upper region 120 of the airbag cushion 100, which deploys from the upper side position of the seat, is deployed protruding towards the driver seated on the driver's seat, providing support to the upper body of the driver.

Therefore, in vehicles without a center console, the lower region 110 of the airbag cushion 100 is supported on the front passenger seat, restraining the lower body of the driver, while the upper region 120 of the airbag cushion 100 restrains the head of the driver, providing protection to the driver.

Furthermore, the airbag cushion 100 supported on the front passenger seat prevents the rotation of the airbag cushion 100 when a passenger is loaded onto the airbag cushion 100.

Therefore, it prevents the upper body of the driver from shifting towards the front passenger side, thus enhancing the restraint force on the driver.

In the present invention, the lower region 110 may deploy in a wrapping motion protruding in one or more of inward and outward directions with respect to a side of the first seat 10. For example, the lower region 100 may be bent when deployed and protrude toward the second seat 20.

Figure 3:
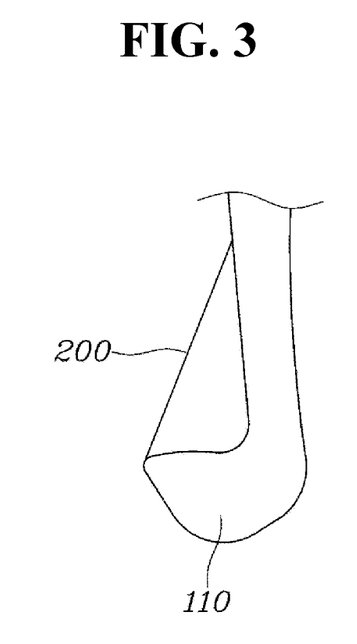
FIGS. 3 to 5 are diagrams illustrating a lower region of an airbag cushion protruding in different shapes according to different embodiments of the present invention.

As a preferable example, as shown in FIG. 3, the end portion of the lower region 110 of the airbag cushion 100 may deploy in a wrapping motion in an outward direction towards the front passenger seat.

Figure 4:
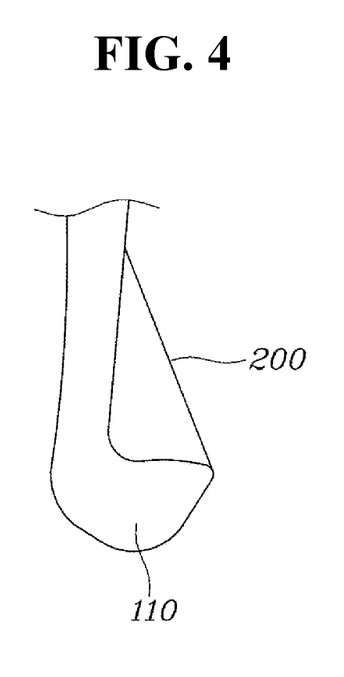

As another example, as shown in FIG. 4, the end portion of the lower region 110 of the airbag cushion 100 may deploy in a wrapping motion in an inward direction towards the driver's seat.

Figure 5:
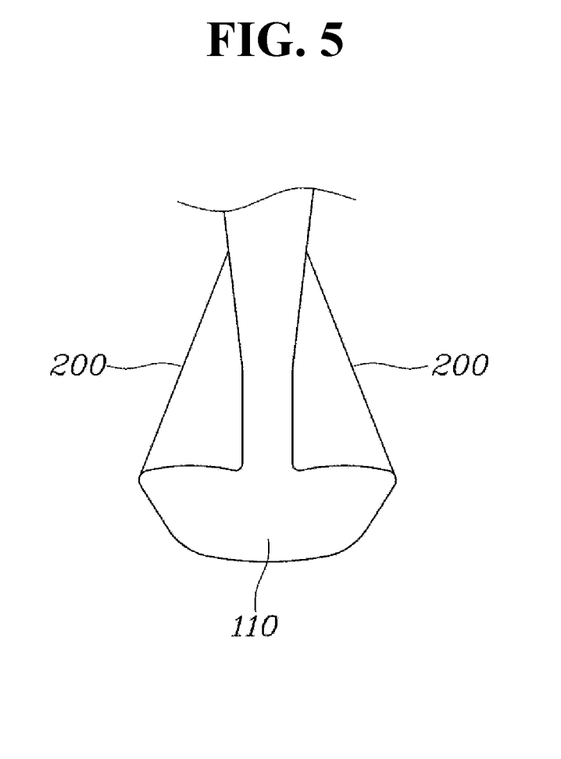

As another example, as shown in FIG. 5, the end portion of the lower region 110 of the airbag cushion 100 may deploy in a wrapping motion in an outward direction towards the front passenger seat and simultaneously in an inward direction towards the driver's seat.

The above embodiments differ in the direction in which the lower region 110 of the airbag cushion 100 wraps but identical in that the lower region 110 protrudes towards the front passenger seat and is supported by the front passenger seat.

As shown in FIG. 1, a first connecting member 200 may be connected between the end portion of the lower region 110 and the intermediate region 130 of the airbag cushion 100, creating tension to allow the lower region 110 to wrap.

For example, one end of the first connecting member 200 may be fixed to the end portion of the lower region 110 of the airbag cushion 100, and the other end of the first connecting member 200 may be pulled upward and fixed to the outer middle portion of the airbag cushion 100, allowing the lower region 110 to deploy in a wrapped shape outward.

Meanwhile, in the present invention, the upper region 120 may deploy in a wrapping motion protruding in one or more of inward and outward directions with respect to a side of the first seat 10. For example, the upper region 120 may be bent when deployed and protrude toward the first seat 10.

Figure 6:
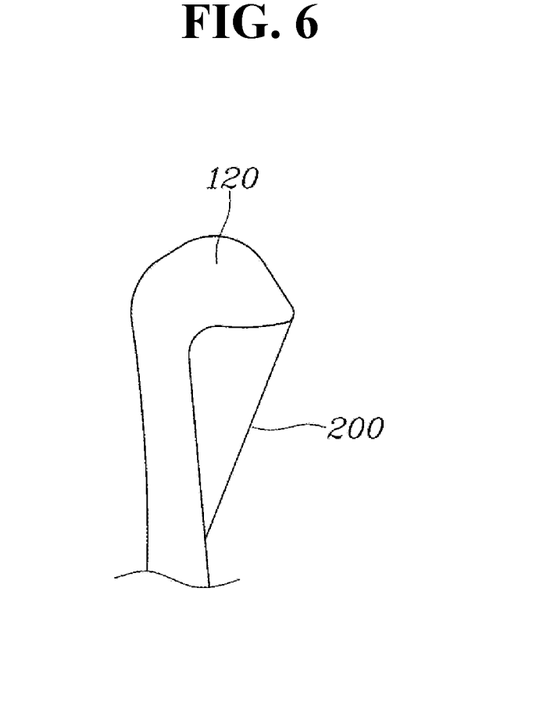
FIGS. 6 to 8 are diagrams illustrating an upper region of an airbag cushion protruding in different shapes according to different embodiments of the present invention.

As a preferred example, as shown in FIG. 6, the end portion of the upper region 120 of the airbag cushion 100 may deploy in a wrapping motion in an inward direction towards the driver's seat.

Figure 7:
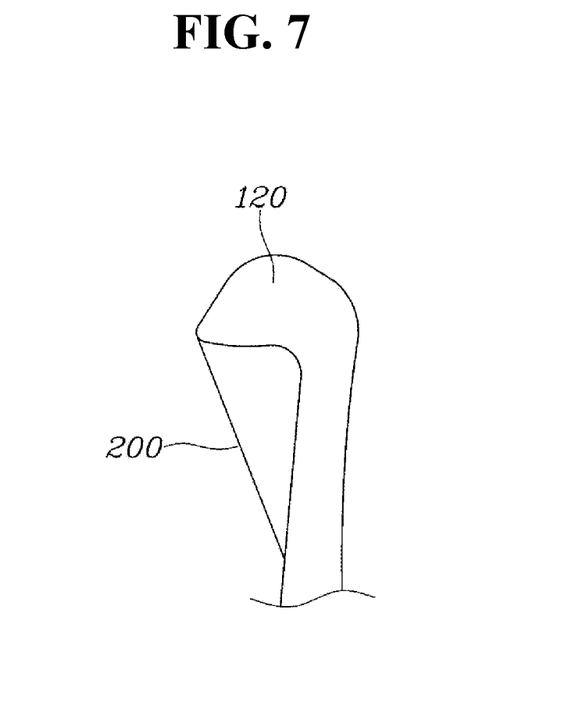

As another example, as shown in FIG. 7, the end portion of the upper region 120 of the airbag cushion 100 may deploy in a wrapping motion in an outward direction towards the front passenger seat.

Figure 8:
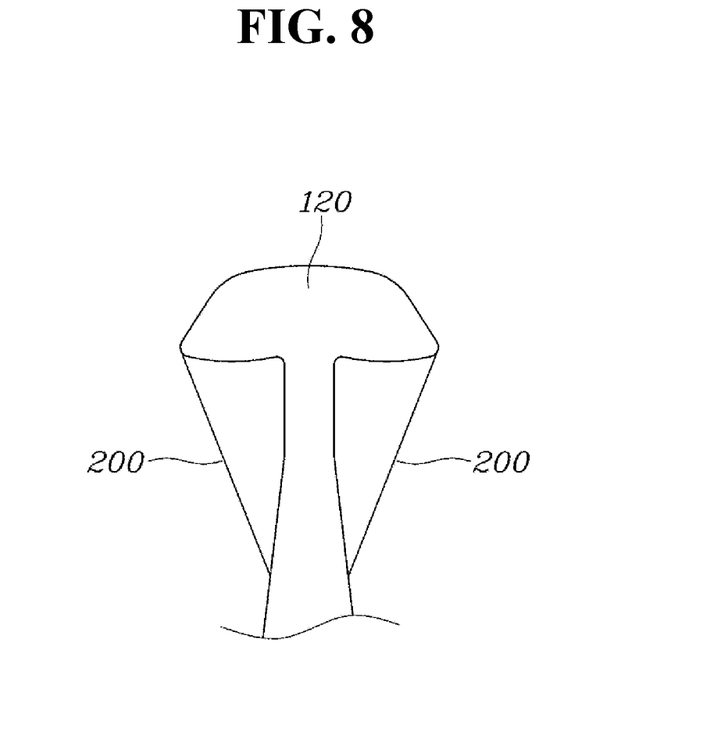

As another example, as shown in FIG. 8, the end portion of the upper region 120 of the airbag cushion 100 may deploy in a wrapping motion in an inward direction towards the driver's seat and simultaneously in an outward direction towards the front passenger seat.

The above embodiments differ in the direction in which the upper region 120 of the airbag cushion 100 wraps, but identical in that the upper region 120 protrudes towards the driver's seat, providing support to the driver.

As shown in FIG. 1, a first connecting member 200 may be connected between the end of the upper region 120 and the intermediate region 130 of the airbag cushion 100, creating a tension and allowing the upper region 120 to wrap.

For example, one end of the first connecting member 200 may be fixed to the end portion of the upper region 120 of the airbag cushion 100, and the other end of the first connecting member 200 may be pulled downward and fixed to the inner middle portion of the airbag cushion 100, allowing the upper region 120 to deploy in a wrapped shape inward.

Figure 9:
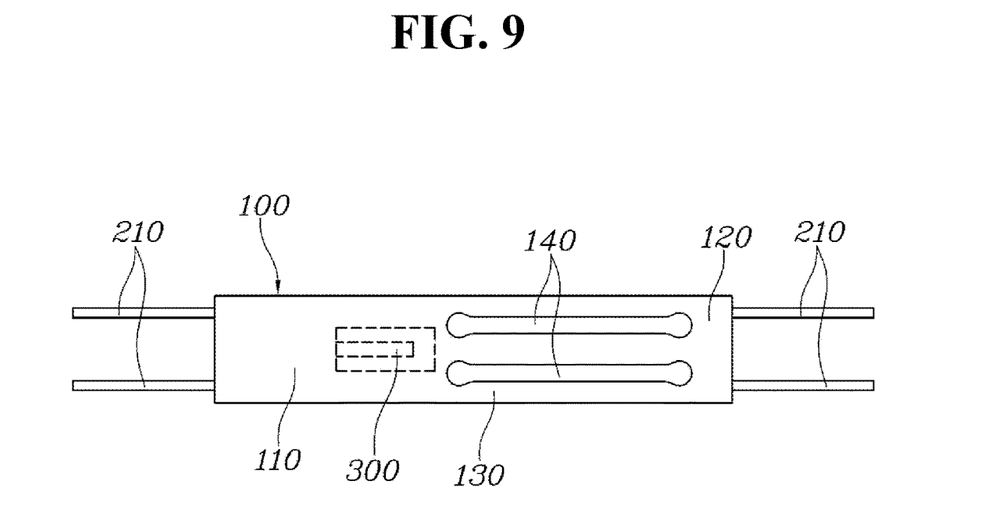
FIG. 9 is a diagram illustrating a deployed airbag cushion with tethers connected thereto according to the present invention.

Furthermore, as shown in FIGS. 1 and 9, an intermediate inactive zone 140, which is not filled with gas, may be formed in the intermediate region 130, and the first connecting member 200 may be connected to the intermediate inactive zone 140.

For example, the intermediate inactive zone 140 is formed along the vertical length direction of the airbag cushion 100, and by securing the first connecting member 200 within the intermediate inactive zone 140, the first connecting member 200 may be securely fixed to the airbag cushion 100.

In this case, the amount of bending and protrusion of the lower region 110 and upper region 120 may be adjusted based on the length of the intermediate inactive zone 140 or the length of the first connecting member 200.

As an example of the first connecting member 200, a tether 210 may be employed.

The tether 210 is formed in the shape of a belt or band of which one end is sewn to the end portion of the lower and upper regions 110 and 120 and the other end of each tether 210 is sewn to the intermediate inactive zone 140.

Figure 10:
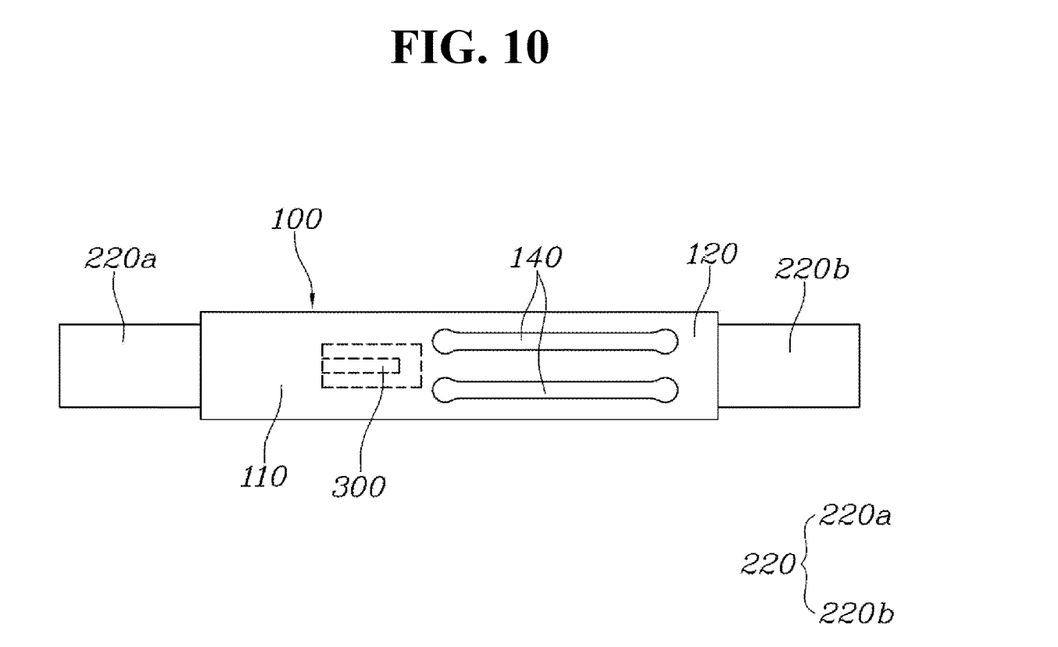
FIG. 10 is a diagram illustrating a deployed airbag cushion with upper and lower inactive zones according to the present invention.

Also, as another example of the first connecting member 200, as shown in FIG. 10, upper and lower inactive zones, which are not filled with gas, may be formed at the ends of the lower and upper regions 110 and 120, respectively, to serve as the first connecting member 200.

That is, the lower inactive zone 220a is formed in a shape extending beneath the airbag cushion 100, and the end portion of the lower inactive zone 220a is sewn to the intermediate inactive zone 140, while the upper inactive zone 220b is formed in a shape extending above the airbag cushion 100, and the end portion of the upper inactive zone 220b is sewn to the intermediate inactive zone 140.

Meanwhile, in the present invention, the lower region 110 of the airbag cushion 100 may deploy prior to the deployment of the upper region 120, as shown in FIG. 2.

To this end, the inflator 400 is fixed to the seat back frame of the driver's seat and connected to the lower region 110 of the airbag cushion 100.

As a result, the lower region 110 of the airbag cushion 100 deploys first to restrain the pelvis area of the occupant, which typically moves faster, and then the upper region 120 of the airbag cushion 100 deploys to restrains the head area of the occupant.

Figure 11:
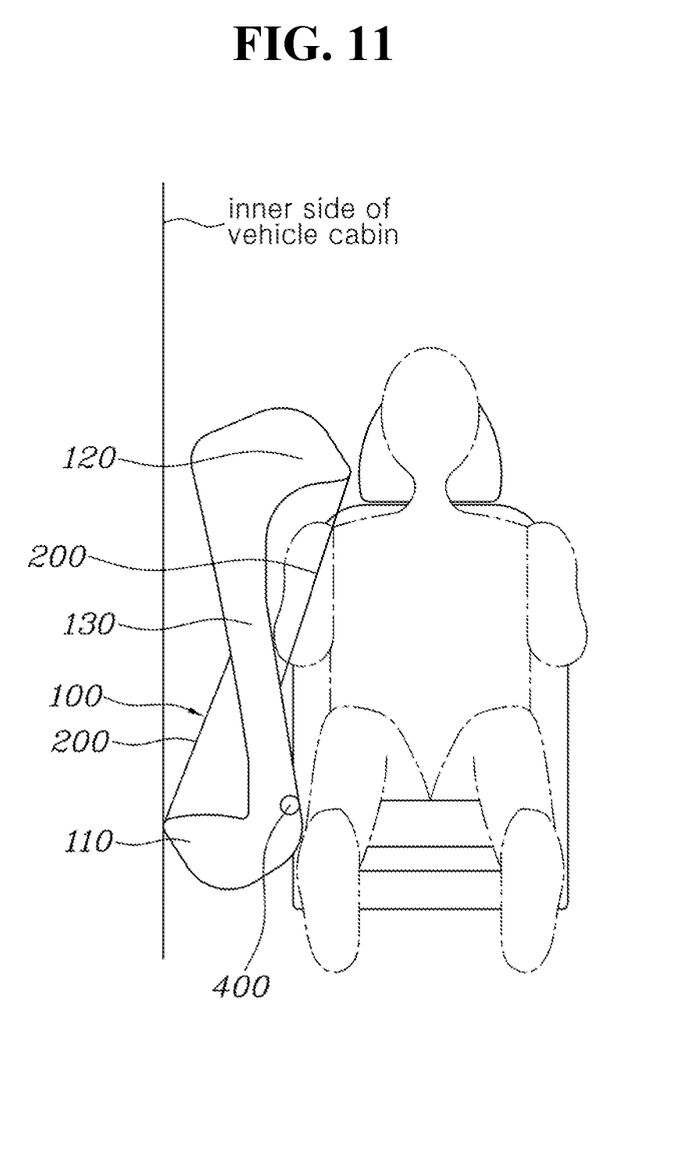
FIG. 11 is a diagram illustrating the operational state of an airbag supported on the inner side of the vehicle cabin is supporting the driver's seat occupant according to the present invention.

Meanwhile, in the present invention, the airbag cushion 100 may be deployed not only between the driver's seat and the front passenger seat but also between the driver's seat and the inner side of the vehicle cabin, or between the front passenger seat and the inner side of the vehicle cabin.

To this end, the present invention includes an airbag cushion 100 that deploys vertically from the side of the seat, a lower region 110 that deploys in a shape protruding towards the structure present beside (or positioned adjacent to) the seat from the lower part of the airbag cushion 100, and an upper region 120 that deploys in a shape protruding towards the occupant seated on the seat from the upper part of the airbag cushion 100.

For example, the aforementioned structure may be a vehicle's side door or side body, and the seat may be a seat facing the inner side of the vehicle cabin.

In the case of the front passenger seat, when the airbag is activated, the lower region 110 of the airbag cushion 100 deploys from the lower side of the seat in a shape protruding towards the front passenger side door, thereby being supported by the inner side of the front passenger side door.

And the upper region 120 of the airbag cushion 100 deploys from the upper side of the seat in a shape protruding towards the occupant seated on the front passenger seat, restraining the upper body of the front passenger.

Therefore, the lower region 110 of the airbag cushion 100 is supported by the vehicle's interior side, restraining the lower limbs of the occupant on the front passenger seat, and additionally, the upper region 120 of the airbag cushion 100 restrains the head of the occupant on the front passenger seat, providing protection to the occupant.

Although the description is made with the front passenger seat as an example, the same concept may be applied to the driver's seat as well.

Figure 12:
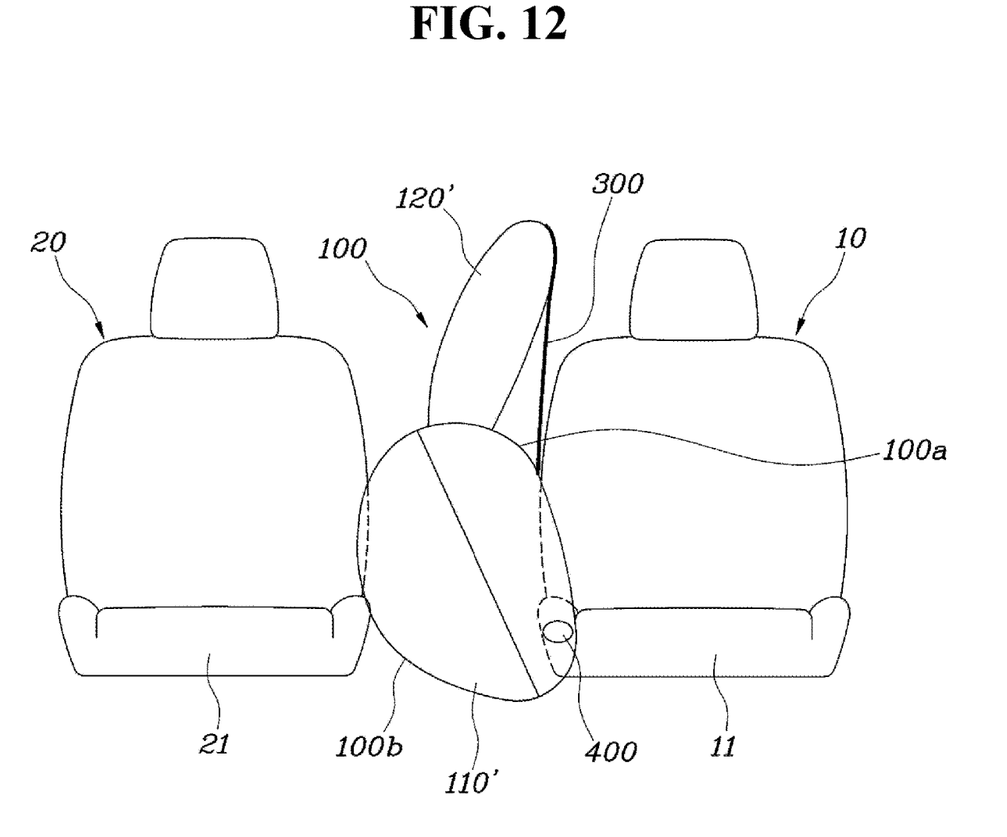
FIG. 12 is a diagram illustrating the operational state of the center side airbag supported on the front passenger seat is deployed along with first and second cushions responsible for upper and lower regions to support the driver's seat occupant according to the present invention.

Meanwhile, with reference to FIG. 12, the present invention may be implemented with an airbag cushion including a first cushion 110' deploying from the lower region and a second cushion 120' deploying from the upper region, the first cushion 110' deploying between the side of the first seat 10 and the side of the second seat 20, the second cushion 120' being connected to the first cushion 110' and deploying upward from a position supporting the head of an occupant seated on the first seat 10, the second cushion 120' being connected to a second connecting member 300 to create a tension to pull the second cushion 120' towards the occupant seated on the first seat 10.

For example, the first cushion 110' is fixed to the side of the seat cushion frame of the first seat (driver's seat) 10 facing the second seat (front passenger seat) 20, and deploys from the side of the seat cushion 11 of the first seat 10.

As a result, the first cushion 110' deploys towards the second seat 20 and may be supported by the side of the second seat 20, for example, the side of the seat cushion 21 of the front passenger seat.

The second cushion 120' is connected to the upper portion of the first cushion 110' and deploys upwards to be positioned to support the head and torso of an occupant seated on the first seat 10.

In addition, the second connecting member 300 is connected to create a tension to pull the second cushion 120' towards the occupant on the driver's seat when the airbag is activated.

Accordingly, in a vehicle without a center console, when a passenger is loaded onto the second cushion 120', the first cushion 110' being supported by the second seat 20 prevents the second cushion 120' from rotating and resultantly preventing the upper body of the occupant on the driver's seat from shifting towards the front passenger side, leading to enhancement of driver's restraint.

Furthermore, as the second cushion 120' is pulled towards the occupant on the driver's seat by the second connecting member 300, it more effectively restrains the head of the driver, providing enhanced protection to the occupant.

Additionally, in the present invention, the first cushion 110' may be supported by the seat cushion 11 of the first seat 10.

That is, in vehicles without a center console, there is a problem where it becomes difficult to effectively restrain the lower limbs of the occupant using the airbag cushion due to the lack of proper support for the airbag cushion.

In this regard, in the present invention, the first cushion 110' is fixed to the seat cushion 11 of the driver's seat, and as a result, the first cushion 110' is supported by the seat cushion 21 of the front passenger seat, allowing the lower limbs of the driver to be supported by the first cushion 110' deployed from the seat cushion 11 of the driver's seat.

Figure 13:
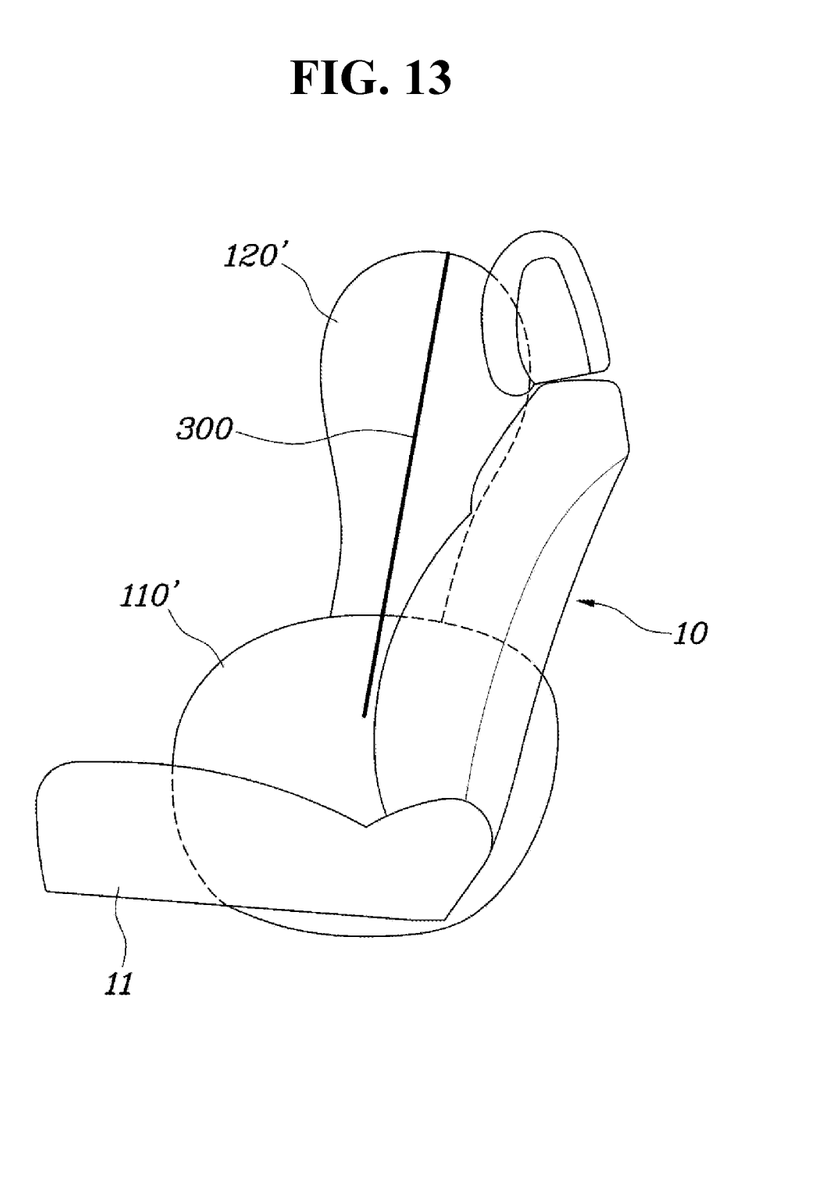
FIG. 13 is a diagram illustrating the deployment positions of the first cushion and the second cushion according to the present invention.

Particularly, the first cushion 110' may be configured to deploy from the rear side of the seat cushion 11.

With reference to FIG. 13, the first cushion 110' may be deployed from the rear side of the seat cushion 11 towards the front for a predetermined length.

That is, when an occupant is seated on the first seat 10, the pelvis of the occupant on the driver's seat, being in contact with the lower part of the seat back, is positioned at the rear end of the seat cushion 11 where it meets the seat back.

Therefore, with the deployment of the first cushion 110' from the rear end of the seat cushion 11, the first cushion 110' enhances the pelvic support for the occupant on the driver's seat.

Meanwhile, in the present invention, the second cushion 120' may be connected to the position of the first cushion 110' that is biased towards the first seat 10.

For example, the first cushion 110' is made of one panel 100a facing the driver's side and another panel 100b facing the front passenger, which are sewn at their edges together.

That is, the lower portion of the second cushion 120' is connected to the upper part of the panel 100a that deploys towards the first seat 10 in a sewn structure.

Therefore, the second cushion 120' deploys from a position relatively closer to the occupant on the driver's seat rather than the front passenger seat, allowing for a quicker restraint of the driver.

Additionally, the first cushion 110' may be configured to deploy prior to the second cushion 120'.

To achieve this, an inflater 400 is connected to the first cushion 110', and the inflater 400 is mounted and secured to the seat cushion frame of the first seat 10.

As a result, the first cushion 110' deploys prior to the second cushion 120', restraining the pelvic region of the occupant that experiences relatively faster movement, and subsequently, the second cushion (120') deploys, restraining the head region of the occupant.

In addition, the second cushion 120' may be designed to have a smaller deployment capacity compared to the first cushion 110'.

That is, the first cushion 110' serves as a substitute for the center console, so the capacity of the first cushion 110' has to be relatively larger compared to the second cushion 120'.

Meanwhile, the second cushion 120' for protecting the occupant's head is designed to have a relatively smaller capacity compared to the first cushion 110', allowing the second cushion 120' to deploy more rapidly.

By reducing the deployment time of the second cushion 120', the protective area provided by the second cushion 120' may be established quickly, allowing for the rapid and secure restraint and protection of the occupant.

In addition, the first cushion 110' and the second cushion 120' are interconnected, allowing for the flow of gas therebetween.

That is, the inflater 400 is connected to the first cushion 110' to supply gas to the interior of the first cushion 110', and the first cushion 110' is interconnected with the second cushion 120', allowing gas to flow into the interior of the second cushion 120'.

Here, the second cushion 120' should be formed to be larger than the passage connecting the first cushion 110' and the second cushion 120' in order to cover the passage. In order to reduce the deployment volume of the second cushion 120', it is preferable to shape the cross-sectional area of the passage as narrow as possible.

Meanwhile, the second connecting member 300 may be connected to the position where the occupant of the first seat 10 is supported when the airbag is deployed.

That is, when the occupant on the driver's seat moves towards the front passenger side due to a collision and comes into contact with the second connecting member 300, a tension is generated in the second connecting member 300 as the load from the occupant on the driver's seat is applied to the second connecting member 300.

As a result, the second cushion 120' moves towards the occupant on the driver's seat, allowing for early restraint of the head of the occupant.

Furthermore, the second connecting member 300 may be connected between the first cushion 110' and the second cushion 120'.

Preferably, the second connecting member 300 may be connected between the side of the first cushion 110' facing the occupant on the driver's seat 10 and the top of the second cushion 120'.

In detail, the top end of the second connecting member 300 is sewn to the topmost part of the second cushion 120', while the bottom end of the second connecting member 300 is sewn to the middle of the panel facing the driver's seat among the two panels of the first cushion 110'.

Therefore, as the second connecting member 300 spreads out towards the occupant on the driver's seat, the occupant on the driver's seat may make direct contact with the second connecting member 300 securely.

As an example of the second connecting member 300, a tether may be employed.

The tether 300 is formed in the shape of a belt or band of which the top end is sewn to the second cushion 120' and the bottom end is sewn to the first cushion 110'.

Meanwhile, the airbag cushion of the present invention may be applied as a center side airbag that deploys between the driver's seat and the front passenger seat and be configured to deploy between the driver's seat and the vehicle's interior side or between the front passenger seat and the vehicle's interior side.

Figure 14:
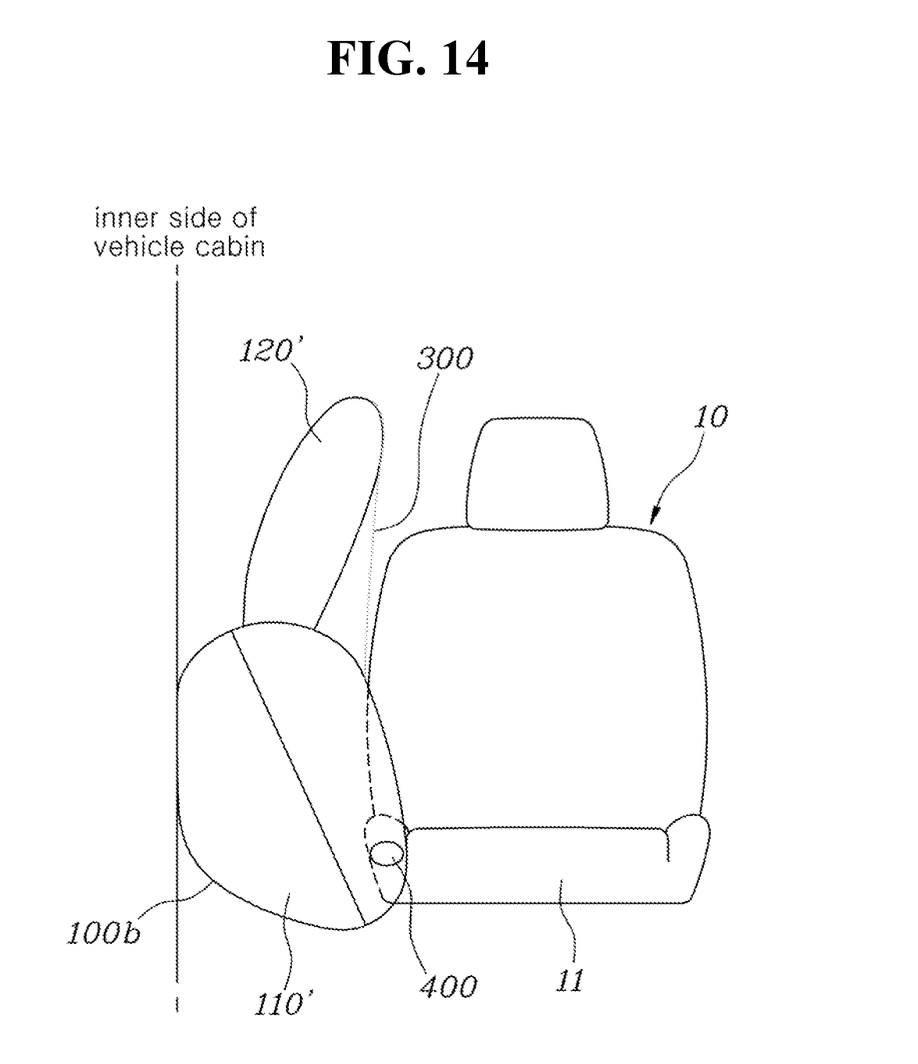
FIG. 14 is a diagram illustrating the operational state of an airbag supported on the inner side of the vehicle cabin is supporting the driver's seat occupant according to the present invention.

With reference to FIG. 14, the present invention comprises a first cushion 110' deploying and being supported between a side of a seat and a structure beside the seat, a second cushion 120' connected to the first cushion 110' and deploying upward from a position supporting the head of the occupant seated on the seat, and a second connecting member 300 connected to the second cushion 120' to create a tension to pull the second cushion 120' towards the occupant seated on the seat.

For example, the aforementioned structure may be a vehicle's side door or side body, and the seat may be a seat facing the inner side of the vehicle cabin.

In the case of the second seat 20, when the airbag is activated, the first cushion 110' deploys from the side of the seat cushion 21 and takes on a shape protruding towards the front passenger side door to be supported by the inner side of the front passenger side door.

The second cushion 120' deploys from the upper position of the first cushion 110' to support the head of the occupant on the front passenger seat.

Furthermore, the second connecting member 300 is connected in a manner that creates a tension to pull the second cushion 120' towards the occupant on the front passenger seat when the airbag is activated.

Therefore, the first cushion 110' is supported against the inner side of the vehicle cabin, restraining the legs of the occupant on the front seat, and simultaneously, the second cushion 120' restrains the head of the occupant on the front passenger seat, providing protection.

Although the description is made with the second seat as an example, the same concept may be applied to the first seat 10 as well.

Hereinafter, a description is made of the method for assembling the airbag cushion 100 of the center side airbag as depicted in FIGS. 9 and 10.

The lower inactive zone 220a or tether 210 formed at the lower end of the airbag cushion 100 is folded outward from the airbag cushion 100, and the end of the lower inactive zone 220a or the tether 210 is sewn and fixed to the intermediate inactive zone 140 located at the center portion on the outer surface of the airbag cushion 100.

Next, the upper inactive zone 220b or tether 210 formed at the upper end of the airbag cushion 100 is folded inward from the airbag cushion 100, and the end of the upper inactive zone 220b or the tether 210 is sewn and fixed to the intermediate inactive zone 140 located at the center portion on the inner surface of the airbag cushion 100.

As a result, when the airbag is activated, the lower portion of the airbag cushion 100 deploys in a shape protruding towards the front passenger seat, being supported by the side of the front passenger seat.

Furthermore, the upper portion of the airbag cushion 100 deploys in a shape protruding towards the occupant seated on the driver's seat, providing support to the upper body of the driver.

Therefore, in vehicles without a center console, the lower region 110 of the airbag cushion 100 is supported on the front passenger seat, restraining the lower body of the driver, while the upper region 120 of the airbag cushion 100 restrains the head of the driver, providing protection to the driver.

In addition, as the airbag cushion 100 is supported by the front passenger seat, it prevents the airbag cushion 100 from rotating, thus preventing the upper body of the driver from moving towards the front passenger side, enhancing occupant restraint.

Furthermore, by providing support to the occupants through the shape modification of the airbag cushion alone, there is no need to increase the volume or capacity of the inflator, resulting in cost and weight reduction of the airbag cushion and offering advantages in terms of airbag packaging.

Although the present invention has been described in detail with specific examples, but it is obvious to those skilled in the art that various modifications and alteration can be made without departing from the scope of the technical idea of this invention, and such modifications and alterations fall within the scope of the appended claims.

What is claimed is:

1. An airbag configured, when deployed, to be positioned between first and second seats disposed side by side in a vehicle, the airbag having an airbag cushion comprising:
   an intermediate region configured to expand between the first and second seats when the airbag cushion is inflated and deployed;
   a lower region connected to a lower end portion of the intermediate region and configured to protrude from the lower end portion of the intermediate region toward the second seat when the airbag cushion is inflated and deployed; and
   an upper region connected to an upper end portion of the intermediate region and configured, when deployed, to protrude from the upper end portion of the intermediate region toward an occupant seated on the first seat when the airbag cushion is inflated and deployed,
   wherein, when the airbag cushion is inflated and deployed between the first and second seats, the intermediate region has a first length in a vertical direction of the vehicle that is greater than a second length of the lower region in the vertical direction of the vehicle and a third length of the upper region in the vertical direction of the vehicle.

2. The airbag of claim 1, wherein the lower region is configured to be bent to protrude toward the second seat when the airbag cushion is inflated and deployed.

3. The airbag of claim 2, further comprising a connecting member connected to and extending between the lower region and the intermediate region and configured to create a tension causing the lower region to be bent.

4. The airbag of claim 3, wherein:
the intermediate region includes an inactive zone configured not to be filled with gas when the airbag cushion is inflated, and
the connecting member is connected to the inactive zone.

5. The airbag of claim 3, wherein the connecting member comprises upper and lower inactive zones respectively extending from the upper and lower regions.

6. The airbag of claim 1, wherein the upper region is configured to be bent to protrude toward the first seat when the airbag cushion is inflated and deployed.

7. The airbag of claim 6, further comprising a connecting member extending between the upper region and the intermediate region and configured to create a tension causing the upper region to be bent.

8. The airbag of claim 1, wherein the lower region is configured to deploy before the upper region deploys when the airbag cushion is inflated and deployed.

\* \* \* \* \*